(12) United States Patent
Cho

(10) Patent No.: US 11,465,487 B2
(45) Date of Patent: *Oct. 11, 2022

(54) POWER TRANSMISSION APPARATUS FOR HYBRID ELECTRIC VEHICLE

(71) Applicants: Hyundai Motor Company, Seoul (KR); Kia Corporation, Seoul (KR)

(72) Inventor: Hang Chul Cho, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/321,047

(22) Filed: May 14, 2021

(65) Prior Publication Data

US 2022/0185094 A1    Jun. 16, 2022

(30) Foreign Application Priority Data

Dec. 16, 2020  (KR) .......................... 10-2020-0176218

(51) Int. Cl.
*B60K 6/547* (2007.10)
*F16H 37/06* (2006.01)
*B60K 6/442* (2007.10)
*B60K 6/365* (2007.10)
*B60K 6/54* (2007.10)

(52) U.S. Cl.
CPC .............. *B60K 6/547* (2013.01); *B60K 6/365* (2013.01); *B60K 6/442* (2013.01); *F16H 37/065* (2013.01); *B60K 2006/541* (2013.01); *B60Y 2200/92* (2013.01); *F16H 2200/0078* (2013.01); *F16H 2702/02* (2013.01)

(58) Field of Classification Search
None
See application file for complete search history.

(56) References Cited

U.S. PATENT DOCUMENTS

| | | | |
|---|---|---|---|
| 8,790,202 B2 * | 7/2014 | Sakai ..................... | B60K 6/365 |
| | | | 475/5 |
| 8,827,852 B2 * | 9/2014 | Ikegami ................ | B60W 20/00 |
| | | | 475/5 |
| 9,114,700 B2 * | 8/2015 | Park ...................... | B60K 6/547 |

(Continued)

FOREIGN PATENT DOCUMENTS

DE    102014117438 A1 *  7/2015  ............. B60K 6/365

*Primary Examiner* — Dirk Wright
(74) *Attorney, Agent, or Firm* — Morgan, Lewis & Bockius LLP

(57) ABSTRACT

A power transmission apparatus of a hybrid electric vehicle may include a first shaft fixedly connected to an engine, a second shaft selectively connectable to the first shaft and fixedly connected to a motor-generator, a third shaft disposed on a same axis with the first shaft and selectively connectable to the second shaft, a fourth shaft disposed coaxially with the third shaft without rotational interference therebetween, a fifth shaft disposed in parallel with the third and fourth shafts and externally gear-meshed with the third and fourth shafts, a planetary gear set having three elements, one element being fixedly connected to the second shaft, another element being selectively connectable to a transmission housing, and a remaining element being fixedly connected to the fourth shaft, and four gear sets forming gear engagements between the first shaft, the second shaft, the third shaft, the fourth shaft and the fifth shaft.

13 Claims, 2 Drawing Sheets

(56) References Cited

U.S. PATENT DOCUMENTS

| | | | | |
|---|---|---|---|---|
| 9,194,483 B2* | 11/2015 | Igarashi | ............. | F16H 57/0436 |
| 9,227,636 B2* | 1/2016 | Yamamoto | ............ | F16H 63/486 |
| 9,346,462 B2* | 5/2016 | Park | ..................... | B60W 20/40 |
| 10,246,081 B2* | 4/2019 | Toyama | ............... | B60W 10/113 |
| 11,285,799 B1* | 3/2022 | Cho | ....................... | B60K 6/547 |
| 2015/0006000 A1* | 1/2015 | Kawata | ................ | B60W 20/30 |
| | | | | 180/65.265 |

* cited by examiner

FIG. 2

| | Shift-stage | CL1 | CL2 | BK | SM1 | SM2 | SM3 | |
|---|---|---|---|---|---|---|---|---|
| Engine mode and HEV mode | 1st | ● | | | ●(↑) | ●(↑) | | |
| | 2nd | ● | ● | | ●(↑) | | | |
| | 3rd | ● | ● | | | ●(↓) | | |
| | 4th | ● | ● | | ●(↓) | | | |
| | 5th | ● | | ● | | | ●(↑) | |
| | 6th | ● | | ● | | ●(↑) | ●(↑) | |
| | Reverse | | | | | | | Reverse rotation of MG |
| EV mode | 1st | | | ● | ●(↑) | ●(↑) | | |
| | 2nd | | ● | ● | ●(↑) | | | |
| | 3rd | | ● | ● | | ●(↓) | | |
| | 4th | | ● | ● | ●(↓) | | | |
| | 5th | | | ● | | | ●(↑) | |
| | 6th | | | ● | | ●(↑) | ●(↑) | |
| | Reverse | | | | | | | Reverse rotation of MG |

POWER TRANSMISSION APPARATUS FOR HYBRID ELECTRIC VEHICLE

CROSS-REFERENCE TO RELATED APPLICATION

The present application claims priority to Korean Patent Application No. 10-2020-0176218 filed on Dec. 16, 2020, the entire contents of which is incorporated herein for all purposes by this reference.

BACKGROUND OF THE INVENTION

Field of the Invention

The present invention relates to a power transmission apparatus for a hybrid electric vehicle.

Description of Related Art

An environment-friendly technology of a vehicle is a core technology which controls survival of a future vehicle industry, and advanced vehicle makers have focused their energy on the development of an environment-friendly vehicle to achieve environmental and fuel efficiency regulations.

Therefore, vehicle makers have developed an electric vehicle (EV), a hybrid electric vehicle (HEV), a fuel cell electric vehicle (FCEV), and the like, as future vehicle technologies.

Since the future vehicle has various technological restrictions such as a weight and cost, the vehicle makers have paid attention to the hybrid electric vehicle as an alternative of a realistic problem for meeting exhaust gas regulations and improving fuel efficiency performance and have entered into keen competition for commercializing the hybrid electric vehicle.

The hybrid electric vehicle is a vehicle using two or more power sources. Two or more power sources may be combined by various schemes and a gasoline engine or a diesel engine using the existing fossil fuel and a motor-generator driven by electrical energy are mixed and used as the power sources.

In the hybrid electric vehicle, an EV mode in which the hybrid electric vehicle is driven by only the motor, an HEV mode using both the engine and the motor, and an ENG mode using only the engine may be implemented according to the combination of the engine and the motor.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a hybrid electric vehicle having power sources of an engine and a motor-generator, and may include a first shaft fixedly connected to an output side of the engine, a second shaft selectively connectable to the first shaft and fixedly connected to the motor-generator, a third shaft disposed on a same axis with the first shaft and selectively connectable to the second shaft, a fourth shaft formed as a hollow shaft and disposed external to and coaxially with the third shaft without rotational interference therebetween, a fifth shaft disposed in parallel with the third and fourth shafts and externally gear-meshed with the third and fourth shafts, a planetary gear set having three rotation elements, one rotation element of the three rotation elements being fixedly connected to the second shaft, another rotation element of the three rotation elements being selectively connectable to a transmission housing, and a remaining rotation element of the three rotation elements being fixedly connected to the fourth shaft, and four gear sets forming gear engagements between the first shaft, the second shaft, the third shaft, the fourth shaft and the fifth shaft.

The planetary gear set may be formed as a single pinion planetary gear set having a first rotation element of a sun gear, a second rotation element of a planet carrier, and a third rotation element of a ring gear.

The first rotation element may be selectively connectable to the transmission housing. The second rotation element may be fixedly connected to the fourth shaft. The third rotation element may be fixedly connected to the second shaft.

The exemplary power transmission apparatus may further include two clutches each selectively connecting corresponding shafts, and a brake selectively connecting one of the three rotation elements and the transmission housing.

The two clutches may include a first clutch disposed between the first shaft and the second shaft, and a second clutch disposed between the second shaft and the third shaft. The brake may be disposed between the other rotation element and the transmission housing.

The four gear sets may include a first gear set including a first drive gear fixedly disposed on the third shaft and a first driven gear disposed external to and coaxially with the fifth shaft without rotational interference and externally gear-meshed with the first drive gear, a second gear set including a second drive gear fixedly disposed on the third shaft and a second driven gear disposed external to and coaxially with the fifth shaft without rotational interference and externally gear-meshed with the second drive gear, a third gear set including a third drive gear disposed external to and coaxially with the fourth shaft without rotational interference and a third driven gear fixedly disposed on the fifth shaft and externally gear-meshed with the third drive gear, and a fourth gear set including a fourth drive gear fixedly disposed on the fourth shaft and a fourth driven gear disposed external to and coaxially with the fifth shaft without rotational interference and externally gear-meshed with the fourth drive gear.

The exemplary power transmission apparatus may further include a first synchronizer configured to selectively connect the first driven gear and the second driven gear to the fifth shaft, a second synchronizer configured to selectively connect the third drive gear and fourth shaft or to selectively connect the third shaft and the fourth shaft, and a third synchronizer configured to selectively connect the fourth driven gear and the fifth shaft.

A power transmission apparatus of a hybrid electric vehicle according to various exemplary embodiments of the present invention may realize six forward shifting stages and one reverse shifting-stage by a combination of one planetary gear set, three friction elements, eight external gears, and three synchronizers.

By such a simplified configuration, production cost may be reduced, and fuel efficiency may be improved by decreasing an overall weight.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operation chart of friction elements for each driving mode applied to a power transmission apparatus of a hybrid electric vehicle according to various exemplary embodiments of the present invention.

Figure 1:
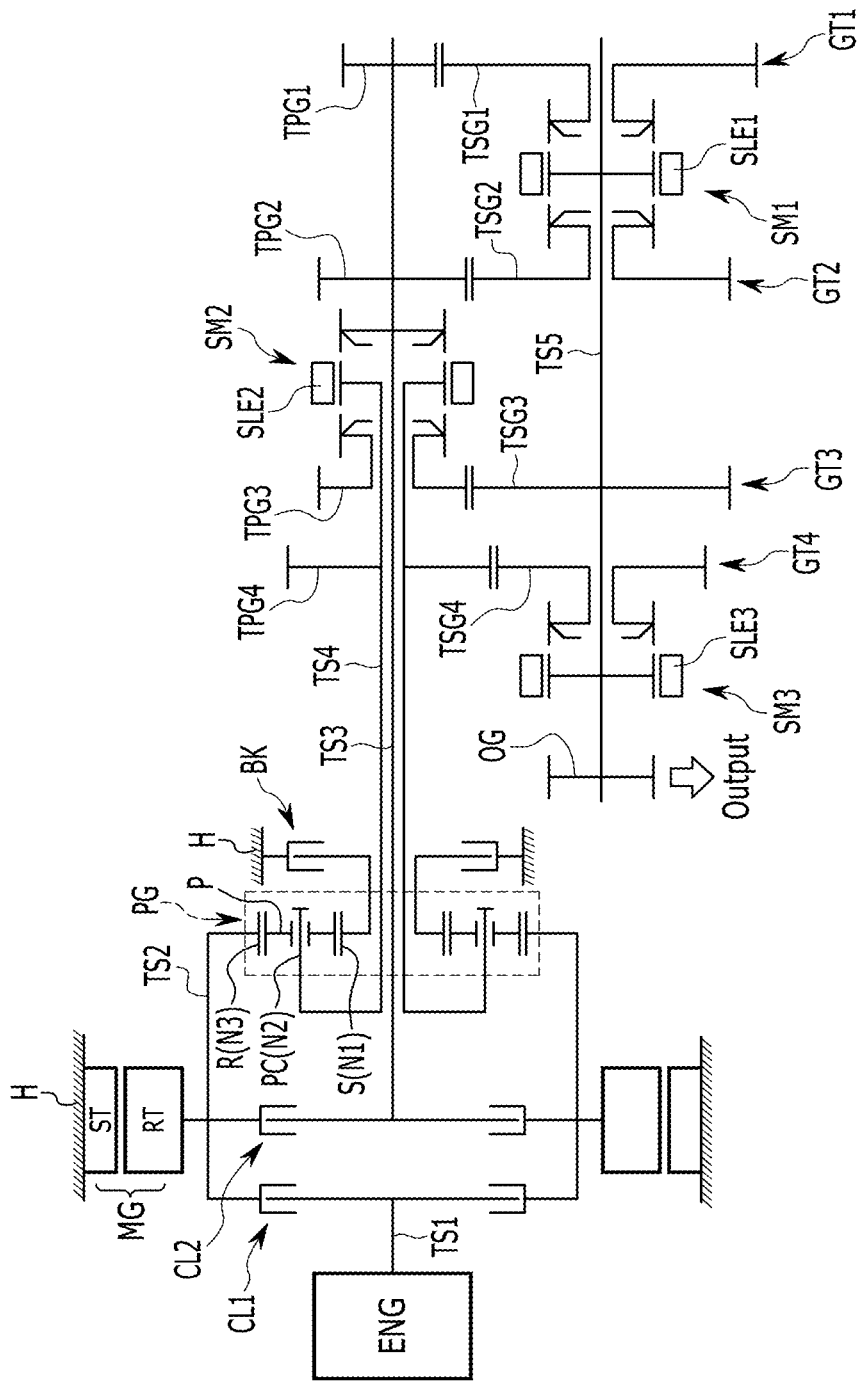
FIG. 1 is a schematic diagram of a power transmission apparatus of a hybrid electric vehicle according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Exemplary embodiments of the present application will be described more fully hereinafter with reference to the accompanying drawings, in which exemplary embodiments of the present invention are shown. As those skilled in the art would realize, the described embodiments may be modified in various different ways, all without departing from the spirit or scope of the present invention.

To clarify the present invention, parts that are not related to the description will be omitted, and the same elements or equivalents are referred to with the same reference numerals throughout the specification.

Also, the size and thickness of each element are arbitrarily shown in the drawings, but the present invention is not necessarily limited thereto, and in the drawings, the thickness of layers, films, panels, regions, etc., are exaggerated for clarity.

In the following description, dividing names of components into first, second, and the like is to divide the names because the names of the components are the same as each other and an order thereof is not particularly limited.

Furthermore, unless explicitly described to the contrary, the word "comprise" and variations such as "comprises" or "comprising", will be understood to imply the inclusion of stated elements but not the exclusion of any other elements.

Furthermore, each of terms, such as " . . . unit", " . . . means", " . . . part", and " . . . member" described in the specification, mean a unit of a comprehensive element that performs at least one function or operation.

FIG. 1 is a schematic diagram of a power transmission apparatus of a hybrid electric vehicle according to various exemplary embodiments of the present invention.

Referring to FIG. 1, a power transmission apparatus of a hybrid electric vehicle according to an exemplary embodiment utilizes power sources of an engine ENG and a motor-generator MG, and includes five shafts TS1 to TS5, one planetary gear set PG, three friction elements CL1, CL2, and BK, four gear sets GT1, GT2, GT3, and GT4, three synchronizers SM1, SM2, and SM3. A power transmission apparatus of a hybrid electric vehicle according to an exemplary embodiment shifts a torque of the engine ENG and a torque of the motor-generator MG and outputs a shifted torque to a differential.

The engine ENG is a primary power source, and may be implemented as one of various types such as a gasoline engine or a diesel engine.

The motor-generator MG is an auxiliary power source, and may function as a motor as a generator. The motor-generator MG includes a stator ST fixed to a transmission housing H and a rotor RT rotatably supported at a radially internal side of the stator ST.

The planetary gear set PG is a single pinion planetary gear set, and includes a sun gear S, a planet carrier PC rotatably supporting a plurality of pinion gears P externally gear-meshed with the sun gear S, and a ring gear R internally gear-meshed with the plurality of pinion gears P, where the sun gear S acts as a first rotation element N1, the planet carrier PC acts as a second rotation element N2, and the ring gear R acts as a third rotation element N3.

The engine ENG, the motor-generator MG, and the planetary gear set PG are interconnected by five shafts TS1 to TS5 to enable power transmission therebetween.

The five shafts TS1 to TS5 are configured as follows.

The first shaft TS1 is fixedly connected to an output side (e.g., a crankshaft) of the engine ENG and receives the torque of the engine ENG, acting as an input shaft.

The second shaft TS2 is fixedly connected to the rotor RT of the motor-generator MG disposed around a rotation axis of the first shaft TS1, and selectively connectable to the first shaft TS1. Therefore, the second shaft TS2 always rotates with the motor-generator MG, and at the same time, may selectively receive the torque of the first shaft TS2.

Furthermore, a rear portion of the second shaft TS2 is fixedly connected to the third rotation element N3 of the planetary gear set PG, and may transfer the torque of the second shaft TS2 to the planetary gear set PG.

The third shaft TS3 is disposed rearward from and on a same axis with the first shaft TS1, and selectively connectable to the second shaft TS2 to selectively receive the torque of the second shaft TS2.

The fourth shaft TS4 is formed as a hollow shaft, disposed external to and coaxially with the third shaft TS3 without rotational interference therebetween, and fixedly connected to the second rotation element N2 of the planetary gear set PG.

Therefore, the fourth shaft TS4 may receive the torques of the engine ENG and the motor-generator MG through the planetary gear set PG.

The fifth shaft TS5 is an output shaft, disposed in parallel with the shafts TS1 to TS4, and fixedly mounted with an output gear OG.

The output gear OG of the fifth shaft TS5 is externally gear-meshed with a final reduction gear of a differential, and may output the torque of the fifth shaft TS5 to the differential.

Among the three rotation elements N1, N2, and N3 of the planetary gear set PG, the first rotation element N1 is selectively connectable to the transmission housing H such that the torque input through the third rotation element N3 may be shifted by the planetary gear set PG and output through the second rotation element N2.

The third and fourth shafts TS3 and TS4 communicates torques with the fifth shaft TS5 through external gear-engagements of the first, second, third, and fourth gear sets TG1, TG2, TG3, and TG4.

The first gear set GT1 includes a first drive gear TPG1 fixedly disposed on the third shaft TS3, and a first driven gear TSG1 disposed external to and coaxially with the fifth shaft TS5 without rotational interference and externally gear-meshed with the first drive gear TPG1.

The second gear set GT2 includes a second drive gear TPG2 fixedly disposed on the third shaft TS3, and a second driven gear TSG2 disposed external to and coaxially with the fifth shaft TS5 without rotational interference and externally gear-meshed with the second drive gear TPG2.

The third gear set GT3 includes a third drive gear TPG3 disposed external to and coaxially with the fourth shaft TS4 without rotational interference therebetween, and a third driven gear TSG3 fixedly disposed on the fifth shaft TS5 and externally gear-meshed with the third drive gear TPG3.

The fourth gear set GT4 includes a fourth drive gear TPG4 fixedly disposed on the fourth shaft TS4, and the fourth driven gear TSG4 disposed external to and coaxially with the fifth shaft TS5 without rotational interference and externally gear-meshed with the fourth driven gear TSG4.

The first, second, and fourth driven gears TSG1, TSG2, and TSG4 and the second and third drive gears TPG2 and TPG3 may be selectively synchronously connected to the fourth shaft TS4 and the fifth shaft TS5 by the first, second, and third synchronizers SM1, SM2, and SM3.

The first synchronizer SM1 is configured to selectively synchronously connect one of the first driven gear TPG1 and the second driven gear TSG2 to the fifth shaft TS5.

Furthermore, the second synchronizer SM2 is configured to selectively synchronously connect the third drive gear TPG3 and the fourth shaft TS4, and to selectively connect the third shaft TS3 and the fourth shaft TS4.

Furthermore, the third synchronizer SM3 is configured to selectively connect the fourth driven gear TSG4 and the fifth shaft TS5.

Gear ratios of the first, second, third, and fourth drive gears TPG1, TPG2, TPG3, and TPG4, and the first, second, third, and fourth driven gears TSG1, TSG2, TSG3, and TSG4 may be set according to design condition of the transmission.

For example, in various exemplary embodiments of the present invention, the gear ratio of the first gear set GT1 may be appropriately set for the first and second shifting stages, the gear ratio of the second gear set GT2 may be appropriately set for the fourth shift-stage, the gear ratio of the third gear set GT3 may be appropriately set for the third shift-stage, and the gear ratio of the fourth gear set GT4 may be appropriately set for the fifth and sixth shifting stages.

The first, second, and third synchronizers SM1, SM2, and SM3 may be implemented as known in the art, and are not described in further detail. First, second, and third sleeves SLE1, SLE2, and SLE3 applied to the first, second, and third synchronizers SM1, SM2, and SM3 may be provided with separate actuators which may be controlled by a transmission control unit.

Furthermore, in various exemplary embodiments of the present invention, friction elements of two clutches CL1 and CL2 and a brake BK are employed to selectively connect corresponding pair of shafts, and to selectively connect a corresponding shaft to the transmission housing H.

The two clutches CL1 and CL2 and the one brake BK are configured as follows.

The first clutch CL1 may be understood as an engine clutch, and is disposed between the first shaft TS1 and the second shaft TS2 to selectively connect the first shaft TS1 and the second shaft TS2, controlling power delivery therebetween.

The second clutch CL2 is disposed between the second shaft TS2 and the third shaft TS3, and selectively connects the second shaft TS2 and the third shaft TS3, controlling power delivery therebetween.

The brake BK is disposed between the transmission housing H and the first rotation element N1 of the planetary gear set PG such that the first rotation element N1 of the planetary gear set PG may selectively act as a fixed element.

The friction elements of the first clutch and second clutch C1 and C2, and a brake BK may be realized as multi-plate hydraulic pressure friction devices that are frictionally engaged by hydraulic pressure, however, it may not be understood to be limited thereto, since various other configuration that are electrically controllable may be available.

In various exemplary embodiments of the present invention, when two or more members are described to be "fixedly connected", where each of the members may be any of a connecting member, a shaft, an input shaft, an output shaft, a rotation member, a transmission housing, and the like, it means that the fixedly connected members always rotate at a same speed. That is, the fixedly connected members always rotate at a same speed and in a same direction thereof.

When two or more members are described to be "selectively connectable", e.g., by an engagement element, it means that the selectively connectable members rotate separately when the engagement element is not engaged, and rotate at a same speed when the engagement element is engaged.

It may be understood that, in the case that a member is "selectively connectable" to a transmission housing by an engagement element, the member may be stationary when the engagement element is engaged.

FIG. 2 is an operation chart of friction elements for each driving mode applied to a power transmission apparatus of a hybrid electric vehicle according to various exemplary embodiments of the present invention.

[Engine and Hybrid (HEV) Mode, First Shift-Stage]

In the first shifting-stage of the engine mode or hybrid (HEV) mode, the first clutch CL1 and the brake BK are operated, the first driven gear TSG1 and the fifth shaft TS5 are synchronously connected by the operation of the first synchronizer SM1, and the second drive gear TPG2 and the third shaft TS3 are synchronously connected by the operation of the second synchronizer SM2.

Accordingly, in the engine mode and in the hybrid (HEV) mode, the torque of the engine ENG is transferred to the second shaft TS2, and in the hybrid (HEV) mode, the torques of the engine ENG and the motor-generator MG are transferred to the second shaft TS2.

Accordingly, the torque of the second shaft TS2 is shifted at the planetary gear set PG, and the shifted torque is transferred to the fourth shaft TS4. The torque transferred to the fourth shaft TS4 is transferred to the third shaft TS3 through the second synchronizer SM2. The torque received at the third shaft TS3 is transferred to the fifth shaft TS5 through the first gear set GT1 and the first synchronizer SM1, and accordingly, output to the differential through the output gear OG, realizing the first forward shift-stage.

That is, the first forward shifting-stage is realized by the speed-reduction of the planetary gear set PG and the gear ratio of the first gear set GT1.

[Engine and Hybrid (HEV) Mode, Second Shift-Stage]

In the second shifting-stage of the engine mode or hybrid (HEV) mode, the first clutch and second clutch CL1 and CL2 are operated, and the first driven gear TSG1 and the fifth shaft TS5 are synchronously connected by the operation of the first synchronizer SM1.

Accordingly, in the engine mode and in the hybrid (HEV) mode, the torque of the engine ENG is transferred to the second shaft TS2, and in the hybrid (HEV) mode, the torques of the engine ENG and the motor-generator MG are transferred to the second shaft TS2.

Accordingly, the torque of the second shaft TS2 is transferred to the third shaft TS3 by the operation of the second clutch CL2. The torque received at the third shaft TS3 is transferred to the fifth shaft TS5 through the first gear set GT1 and the first synchronizer SM1, and ss such, output to the differential through the output gear OG, realizing the second forward shift-stage.

That is, the second forward shifting-stage is realized by the gear ratio of the first gear set GT1.

[Engine and Hybrid (HEV) Mode, Third Shift-Stage]

In the third shifting-stage of the engine mode or hybrid (HEV) mode, the first clutch CL1 and the brake BK are operated, and the third drive gear TPG3 and the fourth shaft TS4 are synchronously connected by the operation of the second synchronizer SM2.

Accordingly, in the engine mode and in the hybrid (HEV) mode, the torque of the engine ENG is transferred to the second shaft TS2, and in the hybrid (HEV) mode, the torques of the engine ENG and the motor-generator MG are transferred to the second shaft TS2.

Accordingly, the torque of the second shaft TS2 is shifted at the planetary gear set PG, and the shifted torque is transferred to the fourth shaft TS4. The torque received at the fourth shaft TS4 is transferred to the fifth shaft TS5 through the second synchronizer SM2 and the third gear set GT3, and accordingly, output to the differential through the output gear OG, realizing the third forward shift-stage.

That is, the third forward shifting-stage is realized by the speed-reduction of the planetary gear set PG and the gear ratio of the third gear set GT3.

[Engine and Hybrid (HEV) Mode, Fourth Shift-Stage]

In the fourth shifting-stage of the engine mode or hybrid (HEV) mode, the first clutch and second clutch CL1 and CL2 are operated, and the second driven gear TSG2 and the fifth shaft TS5 are synchronously connected by the operation of the first synchronizer SM1.

Accordingly, in the engine mode and in the hybrid (HEV) mode, the torque of the engine ENG is transferred to the second shaft TS2, and in the hybrid (HEV) mode, the torques of the engine ENG and the motor-generator MG are transferred to the second shaft TS2.

Accordingly, the torque of the second shaft TS2 is transferred to the third shaft TS3 by the operation of the second clutch CL2. The torque received at the third shaft TS3 is transferred to the fifth shaft TS5 through the second gear set GT2 and the first synchronizer SM1, and accordingly, output to the differential through the output gear OG, realizing the fourth forward shift-stage.

That is, the fourth forward shifting-stage is realized by the gear ratio of the second gear set GT2.

[Engine and Hybrid (HEV) Mode, Fifth Shift-Stage]

In the fifth shifting-stage of the engine mode or hybrid (HEV) mode, the first clutch CL1 and the brake BK are operated, and the fourth driven gear TSG4 and the fifth shaft TS5 are synchronously connected by the operation of the third synchronizer SM3.

Accordingly, in the engine mode and in the hybrid (HEV) mode, the torque of the engine ENG is transferred to the second shaft TS2, and in the hybrid (HEV) mode, the torques of the engine ENG and the motor-generator MG are transferred to the second shaft TS2.

Accordingly, the torque of the second shaft TS2 is shifted at the planetary gear set PG, and the shifted torque is transferred to the fourth shaft TS4. The torque received at the fourth shaft TS4 is transferred to the fifth shaft TS5 through the fourth gear set GT4 and third synchronizer SM3, and accordingly, output to the differential through the output gear OG, realizing the fifth forward shift-stage.

That is, the fifth forward shifting-stage is realized by the speed-reduction of the planetary gear set PG and the gear ratio of the fourth gear set GT4.

[Engine and Hybrid (HEV) Mode, Sixth Shift-Stage]

In the sixth shifting-stage of the engine mode or hybrid (HEV) mode, the first clutch and second clutch CL1 and CL2 are operated, the second drive gear TPG2 and the third shaft TS3 are synchronously connected by the operation of the second synchronizer SM2, and the fourth driven gear TSG4 and the fifth shaft TS5 are synchronously connected by the operation of the third synchronizer SM3.

Accordingly, in the engine mode and in the hybrid (HEV) mode, the torque of the engine ENG is transferred to the second shaft TS2, and in the hybrid (HEV) mode, the torques of the engine ENG and the motor-generator MG are transferred to the second shaft TS2.

Accordingly, the torque of the second shaft TS2 is transferred to the third shaft TS3 by the operation of the second clutch CL2. The torque transferred to the third shaft TS3 is transferred to the fourth shaft TS4 through the second synchronizer SM2. The torque received at the fourth shaft TS4 is transferred to the fifth shaft TS5 through the fourth gear set GT4 and third synchronizer SM3, and accordingly, output to the differential through the output gear OG, realizing the sixth forward shift-stage.

That is, the sixth forward shifting-stage is realized by the gear ratio of the fourth gear set GT4.

[Engine and Hybrid (HEV) Mode, Reverse Shift-Stage]

In the reverse shifting-stage of the engine mode or hybrid (HEV) mode, the brake BK are operated, the first driven gear TSG1 and the fifth shaft TS5 are synchronously connected by the operation of the first synchronizer SM1, and the second drive gear TPG2 and the third shaft TS3 are synchronously connected by the operation of the second synchronizer SM2.

Furthermore, in the reverse shifting-stage of the engine mode or hybrid (HEV) mode, the torque of the engine ENG is not used and only reverse torque of the motor-generator MG is transferred to the second shaft TS2.

Accordingly, the torque of the second shaft TS2 is shifted at the planetary gear set PG, and the shifted torque is transferred to the fourth shaft TS4. The torque received at the fourth shaft TS4 is transferred to the third shaft TS3 through the second synchronizer SM2. The torque received at the third shaft TS3 is transferred to the fifth shaft TS5 through the first gear set GT1 and the first synchronizer SM1, and accordingly, output to the differential through the output gear OG, realizing the reverse shift-stage.

That is, the reverse shifting-stage is realized by the speed-reduction of the reverse torque of the motor-generator MG at the planetary gear set PG and the gear ratio of the first gear set GT1.

Furthermore, in the electric vehicle (EV) mode, only the torque of the motor-generator MG is used without using the torque of the engine ENG, and shifting operation is the same as the engine and hybrid mode except that the first clutch CL1 is not operated.

A power transmission apparatus of a hybrid electric vehicle according to various exemplary embodiments of the present invention may realize six forward shifting stages and one reverse shifting-stage by a combination of one planetary gear set, three friction elements, eight external gears, and three synchronizers.

By such a simplified configuration, production cost may be reduced, and fuel efficiency may be improved by decreasing an overall weight.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A power transmission apparatus for a hybrid electric vehicle having power sources of an engine and a motor-generator, the power transmission apparatus comprising:
   a first shaft fixedly connected to an output side of the engine;
   a second shaft selectively connectable to the first shaft and fixedly connected to the motor-generator;
   a third shaft mounted on a same axis with the first shaft and selectively connectable to the second shaft;
   a fourth shaft formed as a hollow shaft and mounted external to and coaxially with the third shaft without rotational interference between the third shaft and the fourth shaft;
   a fifth shaft mounted in parallel with the third shaft and the fourth shaft and gear-engaged with the third shaft and the fourth shaft;
   a planetary gear set having three rotation elements, one rotation element of the three rotation elements being fixedly connected to the second shaft, another rotation element of the three rotation elements being selectively connectable to a transmission housing, and a remaining rotation element of the three rotation elements being fixedly connected to the fourth shaft; and
   four gear sets forming gear engagements.

2. The power transmission apparatus of claim 1, wherein the planetary gear set is formed as a single pinion planetary gear set having a first rotation element of a sun gear as the another rotation element, a second rotation element of a planet carrier as the remaining rotation element, and a third rotation element of a ring gear as the one rotation element.

3. The power transmission apparatus of claim 2, wherein
   the first rotation element is selectively connectable to the transmission housing;
   the second rotation element is fixedly connected to the fourth shaft; and
   the third rotation element is fixedly connected to the second shaft.

4. The power transmission apparatus of claim 1, further including:
   two clutches each selectively connecting corresponding shafts among the first shaft, the second shaft, the third shaft, the fourth shaft and the fifth shaft; and
   a brake selectively connecting one of the three rotation elements and the transmission housing.

5. The power transmission apparatus of claim 4, wherein the two clutches include:
   a first clutch mounted between the first shaft and the second shaft; and
   a second clutch mounted between the second shaft and the third shaft,
   wherein the brake is mounted between the other rotation element and the transmission housing.

6. The power transmission apparatus of claim 1, wherein the four gear sets include:
   a first gear set including a first drive gear fixedly mounted on the third shaft and a first driven gear mounted external to and coaxially with the fifth shaft without rotational interference with the fifth shaft and gear-engaged with the first drive gear;
   a second gear set including a second drive gear fixedly mounted on the third shaft and a second driven gear mounted external to and coaxially with the fifth shaft without rotational interference with the fifth shaft and gear-engaged with the second drive gear;
   a third gear set including a third drive gear mounted external to and coaxially with the fourth shaft without rotational interference with the fourth shaft and a third driven gear fixedly mounted on the fifth shaft and gear-engaged with the third drive gear; and
   a fourth gear set including a fourth drive gear fixedly mounted on the fourth shaft and a fourth driven gear mounted external to and coaxially with the fifth shaft without rotational interference with the fifth shaft and gear-engaged with the fourth drive gear.

7. The power transmission apparatus of claim 6, further including:
   a first synchronizer configured to selectively connect one of the first driven gear and the second driven gear to the fifth shaft;
   a second synchronizer configured to selectively connect the third drive gear and the fourth shaft or to selectively connect the third shaft and the fourth shaft; and
   a third synchronizer configured to selectively connect the fourth driven gear and the fifth shaft.

8. A power transmission apparatus configured for a hybrid electric vehicle having power sources of an engine and a motor-generator, the power transmission apparatus comprising:
- a first shaft fixedly connected to an output side of the engine;
- a second shaft selectively connectable to the first shaft and fixedly connected to the motor-generator;
- a third shaft disposed on a same axis with the first shaft and selectively connectable to the second shaft;
- a fourth shaft formed as a hollow shaft and disposed external to and coaxially with the third shaft without rotational interference between the third shaft and the fourth shaft;
- a fifth shaft mounted in parallel with the third shaft and the fourth shaft and gear-engaged with the third shaft and the fourth shaft;
- a planetary gear set having three rotation elements, one rotation element of the three rotation elements being fixedly connected to the second shaft, another rotation element of the three rotation elements being selectively connectable to a transmission housing, and a remaining rotation element of the three rotation elements being fixedly connected to the fourth shaft;
- three friction elements; and
- four gear sets forming gear engagements.

9. The power transmission apparatus of claim 8, wherein the planetary gear set is formed as a single pinion planetary gear set having a first rotation element of a sun gear as the another rotation element, a second rotation element of a planet carrier as the remaining rotation element, and a third rotation element of a ring gear as the one rotation element.

10. The power transmission apparatus of claim 9, wherein
- the first rotation element is selectively connectable to the transmission housing;
- the second rotation element is fixedly connected to the fourth shaft; and
- the third rotation element is fixedly connected to the second shaft.

11. The power transmission apparatus of claim 8, wherein the three friction elements include:
- a first clutch mounted between the first shaft and the second shaft;
- a second clutch mounted between the second shaft and the third shaft; and
- a brake mounted between the other rotation element and the transmission housing.

12. The power transmission apparatus of claim 8, wherein the four gear sets include:
- a first gear set including a first drive gear fixedly mounted on the third shaft and a first driven gear mounted external to and coaxially with the fifth shaft without rotational interference with the fifth shaft and gear-engaged with the first drive gear;
- a second gear set including a second drive gear fixedly mounted on the third shaft and a second driven gear mounted external to and coaxially with the fifth shaft without rotational interference with the fifth shaft and gear-engaged with the second drive gear;
- a third gear set including a third drive gear mounted external to and coaxially with the fourth shaft without rotational interference with the fourth shaft and a third driven gear fixedly mounted on the fifth shaft and gear-engaged with the third drive gear; and
- a fourth gear set including a fourth drive gear fixedly mounted on the fourth shaft and a fourth driven gear mounted external to and coaxially with the fifth shaft without rotational interference with the fifth shaft and gear-engaged with the fourth drive gear.

13. The power transmission apparatus of claim 12, further including:
- a first synchronizer configured to selectively connect one of the first driven gear and the second driven gear to the fifth shaft;
- a second synchronizer configured to selectively connect the third drive gear and the fourth shaft or to selectively connect the third shaft and the fourth shaft; and
- a third synchronizer configured to selectively connect the fourth driven gear and the fifth shaft.

* * * * *